United States Patent

Ohta et al.

[11] 3,971,874
[45] July 27, 1976

[54] OPTICAL INFORMATION STORAGE MATERIAL AND METHOD OF MAKING IT

[75] Inventors: Takeo Ohta, Nara; Mutsuo Takenaga, Katano, both of Japan

[73] Assignee: Matsushita Electric Industrial Co., Ltd., Japan

[22] Filed: Aug. 26, 1974

[21] Appl. No.: 500,468

[30] Foreign Application Priority Data

Aug. 29, 1973  Japan.................................. 48-97615
Aug. 29, 1973  Japan.................................. 48-97616
Aug. 29, 1973  Japan.................................. 48-97617

[52] U.S. Cl. ............................... 428/432; 346/76 L; 346/76 R; 350/160 P; 427/162; 427/166; 427/248; 428/422; 428/480; 428/537; 428/539; 428/913

[51] Int. Cl.² ...................... C23C 3/04; G01D 15/34

[58] Field of Search ................. 117/106 R, 33.3, 69; 346/76 R, 76 L; 350/160 P; 161/410; 427/164, 166, 248, 76, 162; 423/508, 509; 428/432, 539, 913, 422

[56] References Cited
UNITED STATES PATENTS

| | | | |
|---|---|---|---|
| 3,406,085 | 10/1968 | Brown et al. | 117/33.3 X |
| 3,445,271 | 5/1969 | Jensen | 117/106 R |
| 3,455,724 | 7/1969 | Teeg et al. | 117/106 R X |
| 3,516,720 | 6/1970 | Mauer | 117/33.3 X |
| 3,565,671 | 2/1971 | Teeg et al. | 117/106 R X |
| 3,665,483 | 5/1972 | Becker et al. | 346/76 L X |
| 3,704,467 | 11/1972 | Frock | 346/76 R X |
| 3,761,942 | 9/1973 | Lorenz et al. | 346/76 L X |
| 3,831,165 | 8/1974 | Chivian et al. | 346/76 R X |

FOREIGN PATENTS OR APPLICATIONS 47-5951  2/1972  Japan.................................. 427/166

*Primary Examiner*—Ralph Husack
*Attorney, Agent, or Firm*—Wenderoth, Lind & Ponack

[57] ABSTRACT

An optical information storage material having a transparent base and a film deposited on the base, the state of which can be changed between a low optical density state and a high optical density state by the application of electrical, optical or thermal energy. The film is a tellurium oxide having the composition $TeO_{x1}$ in which $0 < x1 < 2.0$, or a mixture of such a tellurium oxide and vanadium oxide for making it easier to change the state of the film material, or tellurium oxide and lead oxide for increasing the sensitivity of the film. The material is made by vacuum evaporating and depositing the tellurium oxide or the mixture of tellurium oxide with the vanadium or lead oxide from $TeO_2$ or a solid solution of $TeO_2$ and lead or vanadium oxide.

11 Claims, 8 Drawing Figures

OPTICAL INFORMATION STORAGE MATERIAL AND METHOD OF MAKING IT

BACKGROUND OF THE INVENTION

This invention relates to an optical information storage material, and more particularly pertains to an optical information storage material which employs amorphous material.

Amorphous materials, which can assume two or more physical states, each of which have different optical properties, have hitherto been known. The state of these amorphous materials can be changed by applying electrical, optical, or thermal energy thereto. In one state such material has a so-called non-crystalline bulk structure which has partial order of the atoms and molecules when viewed microscopically is seen to have a non-crystalline structure and low optical density. In the other state the material has a crystalline structure which has relatively high optical density. By utilizing such optical properties, i.e. the change of state from low optical density to high optical density or a reverse change thereof, the amorphous materials have been able to function as an optical information storage device when used in the form of a thin film.

Amorphous materials which have been utilized in an optical information storage device have been such multicomponent materials as (Te, Ge), (Te, Sb) or (Te, Ge, As, Ga, Fe).

The hitherto known materials described above are chalcogenide composites which easily form a two-dimensionally bonded atomic configuration in a glassy state, or are composites which are obtained by adding elements which easily form a covalent tetrahedral atomic structure to the chalcogenide composites.

Those composites are superior in that both crystalline and non-crystalline states thereof are stable at room temperature. With respect to optical sensitivity, however, those composites have insufficient sensitivity for the use in optical information storage.

Furthermore thin films consisting of those composites have a relatively high optical density in the non-crystalline state. Therefore, when making record on a film with a thickness capable of giving a high contrast ratio (e.g. >10 : 1), read-out-efficiency is relatively low i.e. < 10%.

SUMMARY OF THE INVENTION

OBJECTS OF THE INVENTION

It is an object of this invention to provide an optical information storage material employing an amorphous film which has an improved optical sensitiivity.

It is another object of this invention to provide an optical information storage material employing an amorphous film which has a high contrast ratio.

It is a further object of this invention to provide an optical information storage material employing an amorphous film which has a low optical density when there is nothing recorded therein.

It is a further object of this invention to provide an optical information storage material employing an amorphous film which has a simple composition and is easy to make.

It is a further object of this invention to provide an optical information storage material employing an amorphous film the optical state of which is easy to change from one state to the other, so that a recording on the device can easily be erased.

These objects are achieved by an optical information storage material according to the invention having a transparent base and a film deposited on the base, the state of which can be changed between a low optical density state and a high optical density state by the application of electrical, optical or thermal energy. The film is a tellurium oxide having the composition $TeO_{x1}$ in which $0 < x1 < 2.0$. The film can be a mixture of such a tellurium oxide and vanadium oxide having a compositions $VO_{x2}$ where $x2$ is up to 2.5 for making it easier to change the state of the film material. The oxides are in the relation $(TeO_{x1})_{1-y}(VO_{x2})_y$ where $y$ is up to 0.6. The film can be a mixture of tellurium oxide and lead oxide having a composition $Pb\ O_{x3}$ where $x3$ is up to 1 for increasing the sensitivity of the film. The oxides are present according to the formula $(TeO_{x1})_{1-z}(PbO_{x3})_z$ where $z$ is up to 0.6. The film can be a mixture of tellurium oxide and transition metal oxides for increasing the sensitivity of the film.

The material is made by vacuum evaporating and depositing the tellurium oxide or the mixture of tellurium oxide with the vanadium or lead oxide from molten $TeO_2$ or a molten solid solution of $TeO_2$ and lead or vanadium oxide.

The material can further have a transparent protective layer over the film.

BRIEF DESCRIPTION OF THE DRAWING

Other and further objects, features and advantages of the invention will appear more fully from the following description taken with the accompanying drawings, in which.

DETAILED DESCRIPTION OF THE INVENTION

Figure 6:
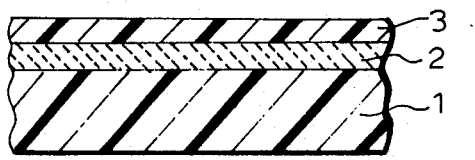
FIG. 6 is a cross-sectional view of an optical information storage material according to the present invention.

Referring to FIG. 6, the optical information storage material of the invention comprises a thin film 2 of tellurium oxide deposited on a base 1 and preferably covered with a protective layer 3 of lacquer or the like. The composition of deposited tellurium oxide is a composition of $TeO_{x1}$ in which $0 < x1 < 2.0$. This composition is obtained by evaporation of ordinary tellurium oxide $TeO_2$ under deoxidizing conditions.

$TeO_2$ is a white powder at room temperature and has a tetragonal crystalline structure. When it is heated in air in a quartz or platinum boat, at the melting temperature of 733°C or more of the oxide, evaporation occurs, and a vapor of $TeO_2$ is generated. Thus, a $TeO_2$ film can be obtained by condensation of the evaporated oxide. This $TeO_2$ film, however, is not good for optical recording because it does not have the characteristic that the optical density thereof changes.

To obtain a deoxidizing condition, vacuum evaporation is carried out and the starting material is heated in a Mo or W boat. A vacuum of about $5 \times 10^{-5}$ mm Hg is used, and even if the degree of vacuum is changed, the properties of the deposited layer do not shown much difference.

As the base for the deposition of $TeO_2$, transparent polyester film, polytetrafluorethylene, glass, or paper is utilized. The base can be in any shape depending on the purpose; for example, a sheet, a drum, a disc, etc.

The composition of the deposited film obtained by such a process is $TeO_{x1}$, wherein $0 < x1 < 2.0$. This composition is different from the starting material, $TeO_2$ because of the reduction produced by the vacuum evaporation.

The film of such composition is pale brown, and its light transmission coefficient increases with lengthening of the wave length, in the range of from 3500 A to 6500 A.

A film thickness of 300 A – 3000 A is suitable.

Optical recording on said film is carried out by Xe flash, infrared lamp, laser, or contact heating with a heater, etc.

The sensitivity for optical recording is affected by the thermal property of the base material. For example, the thinner the base, the greater the sensitivity. It seems to be caused by the fact that the temperature rises easily because of the low heat capacity thereof. Moreover, with regard to the exposure to light, in the case of the Xe flash, recording efficiency is increased on shortening the duration of the flash because the heat-diffusion-loss within the base decreases.

The following examples illustrate preferred embodiments of this invention.

EXAMPLE I $TeO_2$ powder is used as a starting material. It is evaporation deposited on a transparent polyester film thickness of $75\mu$; $50\mu$ or $25\mu$, respectively as a base. A W boat was used, and the degree of vacuum was $5 \times 10^{-5}$ mm Hg.

After evaporation, a transparent protective layer 3 of lacquer etc. was deposited on the surface of the deposited layer. The material obtained by this process was used as an optical information storage material.

Figure 1:
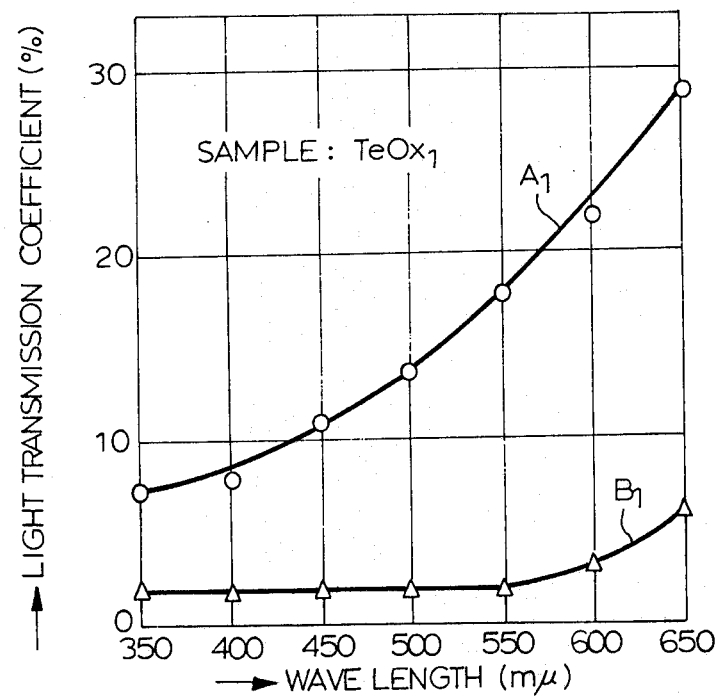
FIGS. 1, 3 and 5 are graphs showing the relation between light transmission coefficient and wave length in the embodiments according to the present invention.

FIG. 1 shows the relation between the light transmission coefficient and wave length for the storage device of this example. In this figure, line $A_1$ is for the sample with nothing recorded thereon and line $B_1$ is for the sample on which information is recorded.

This embodiment has the following advantages as compared with hitherto known amorphous materials in a non-oxided system.

1. The sensitivity is about three times as great.
2. In the non-crystalline state, the light transmission efficiency is about twice as great, since it has a lower optical density. This means that it has a higher contrast ratio, about two times that of the heretofore known material because the optical density in the crystalline state is not very different from heretofore known material.
3. The mechanical strength is excellent because the adherence between the amorphous film and the base is greater.
4. The optical properties are only slightly affected by ordinary light in a room.
5. It is easy to manufacture because of the simple composition of the amorphous material.

In an amorphous film consisting of only ordinary tellurium oxide i.e. $TeO_2$, it is difficult to change the physical state from the high optical density state to the low optical density state, so that it is difficult to erase recorded information.

To improve the erasing property, vanadium oxides such as $V_2O_3$ or $V_2O_5$ can be added.

$V_2O_5$ has a relatively low melting point (690°C) and by evaporating and condensing a solid solution or mixture thereof with tellurium oxide, it is easy to obtain thin film.

When vanadium oxide is used as an additive, the composition of the amorphous film is $(TeO_{x1})_{1-y}(VO_{x2})_y$ in which $0 < x_2 < 2.5$ and $0 < y < 0.5$.

EXAMPLE II the composition of the starting material is $(TeO_2)_{1-Y}(V_2O_5)_y$, wherein $0 < Y < 0.6$. The starting material is obtained by the following steps weighing out powder i.e. $TeO_2$ and $V_2O_5$ in said proportions, mixing the powders, heating them to the liquid state in air and keeping them liquid for 3 – 4 hours in a Pt boat, and quenching them to form a solid solution.

This solid solution is utilized as the starting material for evaporation.

Vacuum evaporation and condensation thereof on a base is carried out using a W boat. The evaporation speed is about 20A/sec.

Figure 2:
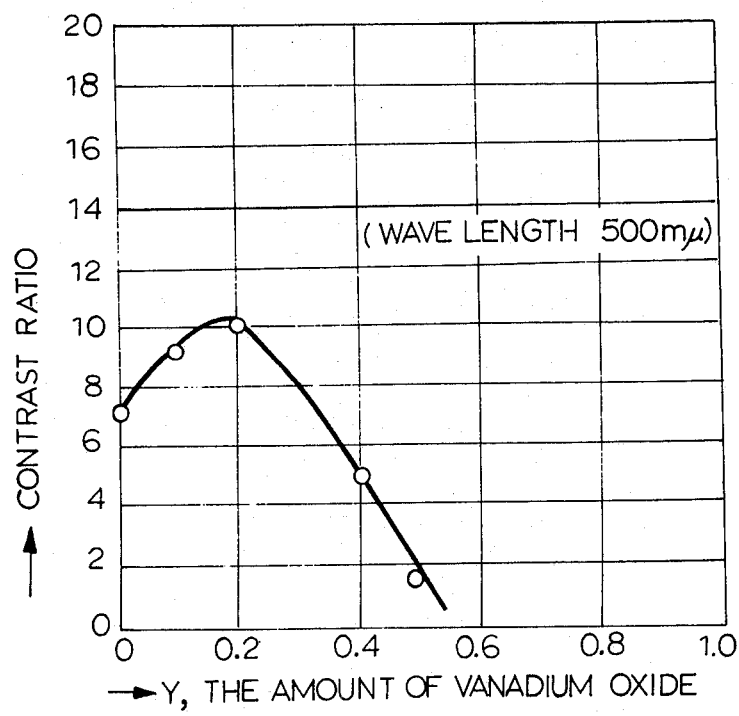
FIG. 2 is a graph showing the relation between the contrast ratio and the amount of vanadium oxide which is used as an additive in the amorphous material according to the present invention.

FIG. 2 shows the relation between contrast ration and y for said composition. As shown in FIG. 2, the contrast ratio becomes higher when Y increases from 0 to about 0.2, shows highest value of 10:1 for $Y \cong 0.2$, and is very low for a value Y more than 0.5.

Figure 3:
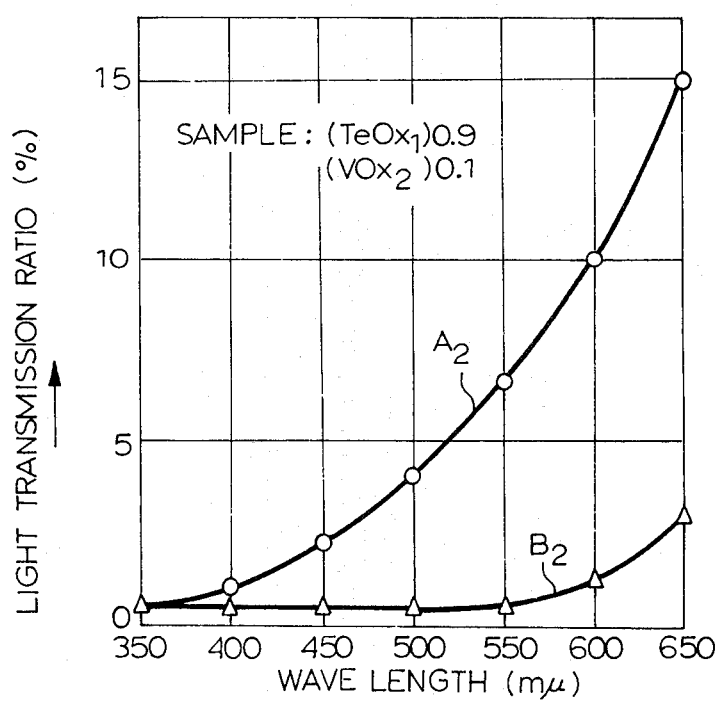

FIG. 3 shows relation between the light transmission coefficient and wave length for a composition within the range of this embodiment. In this figure, line $A_2$ shows the relation for the sample with nothing recorded thereon and line $B_2$ shows the relation for the sample on which information is recorded.

In this embodiment, state of the amorphous film in which information is recorded can be changed to erase the information by exposure to light having a higher energy than that of the recording.

To improve the sensitivity and the contrast ratio, lead oxide can be used as an additive.

When lead oxide is used as an additive, the composition of the amorphous film is $(TeO_{x1})_{1-z}(PbO_{x3})_z$ in which $0 < X_3 < 1.0$ and $0 < Z < 0.5$.

Such film is improved as compared with a film consisting of only tellurium oxide in that it has a higher sensitivity, and because of a higher optical density in the crystalline state it can have a higher contrast ratio.

EXAMPLE III

The composition of the starting material is $(TeO_2)_{1-z}(PbO)_z$; wherein $0 < Z < 0.6$. The starting material is obtained by the following steps: weighing out powdered $TeO_2$ and PbO said proportions, mixing the powders, heating them to the liquid state in air and keeping them in the liquid state in air for 3 – 4 hours in a Pt boat, and then quenching them to produce a solid solution.

This solid solution is used as the starting material for evaporation and condensation. Vacuum evaporation and condensation thereof is carried out using a W boat. The evaporation speed is about 20 A/sec. A polyester film with a thickness of 75 – 25μ is used as a base.

Figure 4:
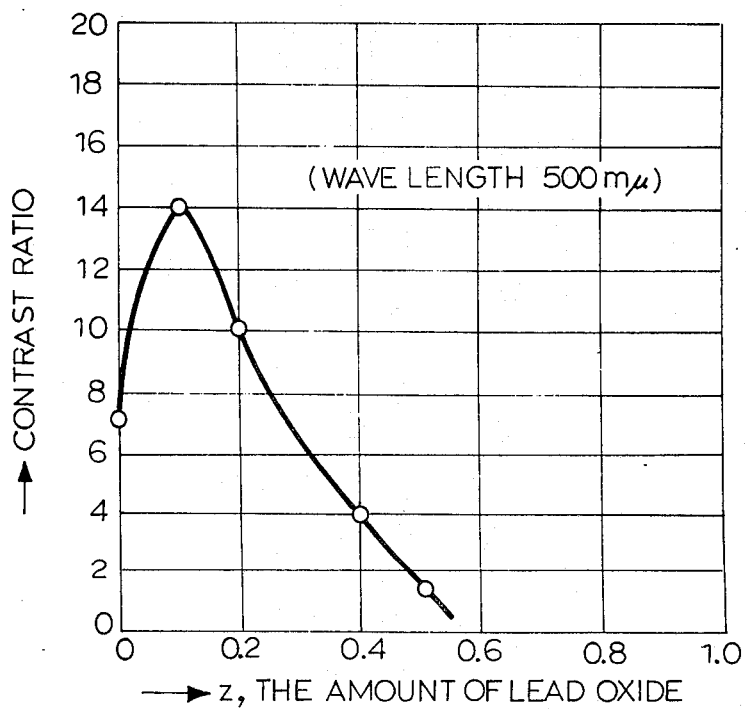
FIG. 4 is a graph showing the relation between the contrast ratio and the amount of lead oxide which is used as an additive in the amorphous material according to the present invention.

FIG. 4 shows the relation between values of the contrast ratio and Z for said composition. As shown in FIG. 4, the contrast ratio becomes higher as Z increases from 0 to about 0.1, having the highest value of 15:1 for $Z \cong 0.1$, and is very low for a value of Y more than 0.5.

Figure 5:
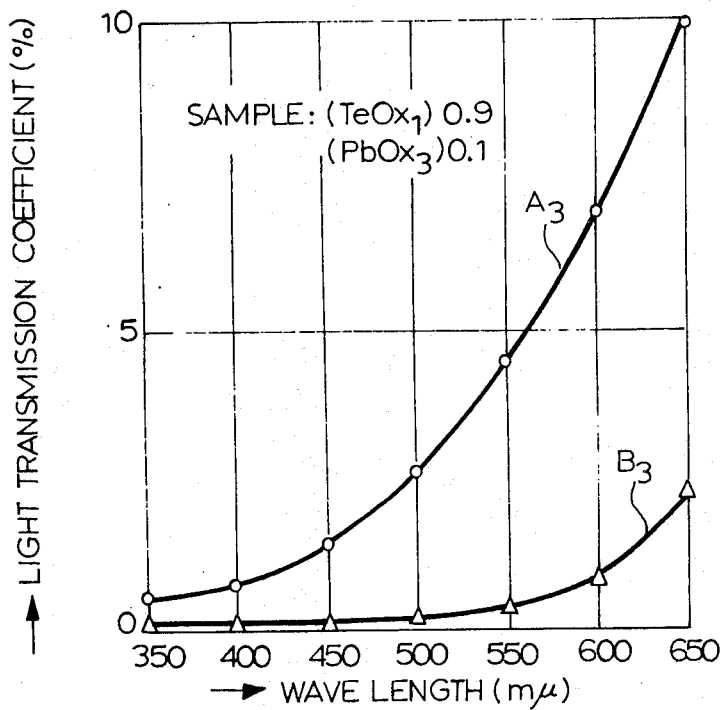

FIG. 5 shows the relation between the light transmission coefficient and wave length for a composition within the range of this embodiment. In this figure, line $A_3$ the relation for a sample on which nothing has been recorded and line $B_3$ shows the relation for a sample on which information has been recorded.

Transition metal oxides are effective as an additive for increasing the sensitivity; for example, $VO_{x2}$, $CrO_{x4}$, $MnO_{x5}$, $FeO_{x6}$, $CoO_{x7}$, $NiO_{x8}$, $WO_{x9}$, $TiO_{x10}$, or $ZrO_{x11}$, in which $0 < x2 < 2.5$, $0 < x4 < 1.5$, $0 < x5 < 2$, $0 < x6 < 1.5$, $0 < x7 < 1.5$, $0 < x8 < 1.5$, $0 < x9 < 3$, $0 < x10 < 2$, and $0 < x11 < 2$.

In above-mentioned transition metal oxides, $VO_{x4}$, $CrO_{x5}$, $MnO_{x6}$, and $CoO_{x8}$, are especially effective as compared with the other transition metal oxides.

The optical information storage material described above can be used in an audio or video recording apparatus, data memory, or like apparatus.

Figure 7:
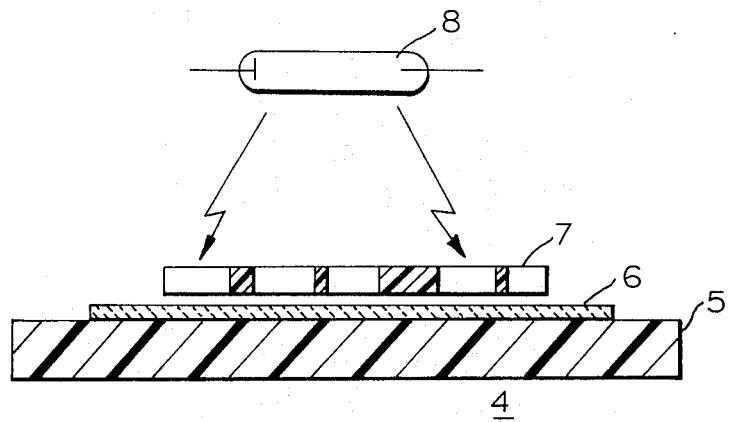
FIG. 7 is a cross-sectional view illustrating a method of copying recorded information on an optical information storage material according to the present invention.
Figure 8:
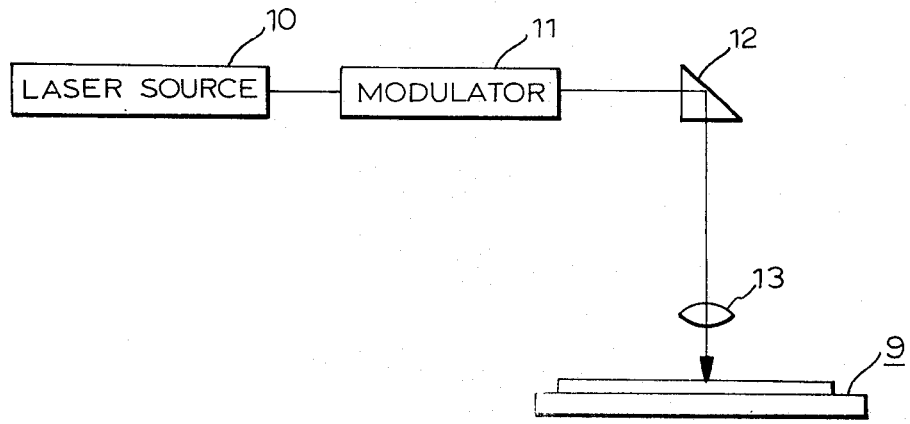
FIG. 8 is a side view of an optical information recording apparatus using an optical information storage material according to this invention.

Examples of such usages are illustrated in FIG. 7 and FIG. 8.

FIG. 7, the numeral 4 represents an optical information storage material consisting of a base sheet 5 and amorphous layer 6. original picture 7 is placed on the optical information storage material 4 in close contact condition. The original picture 7 is formed on a transparent film such as photographic film. From above the original picture 7, light of flash lamp 8 is directed onto picture 7. Thus the original picture is copied on the optical information storage device 4. Referring to FIG. 8, the numeral 9 represents an optical information storage material. The numeral 10 represents a laser source. A laser beam from the laser source 10 passes through a modulator 11, and is modulated thereby with an appropriate information signal. Then it is reflected by a mirror 12 and is focused on the optical information storage material 9 by a focussing lens 13. Thus information is recorded on the optical information storage material by the laser beam.

The embodiments of the invention in which an exclusive property or privilege is claimed are defined as follows:

1. In an optical information storage material having a base and a film deposited on said base the state of which can be changed between the low optical density state and the high optical density state by the application of electrical, optical or thermal energy, the improvement wherein said film comprises $TeO_{x1}$ in which $0 < x1 < 2.0$.

2. The improvement as claimed in claim 1, wherein said film further comprises vanadium oxide as an additive for making it easy to transform the physical state of the film, said vanadium oxide being $VO_{x2}$ and the film having a composition of $(TeO_{x1})_{1-y}(VO_{x2})_y$ in which $0 < x2 < 2.5$ and $0 < Y < 0.6$.

3. The improvement as claimed in claim 1, wherein said film further comprises lead oxide as an additive for increasing the sensitivity of the film, said lead oxide being $PbO_{x3}$ and said film having a composition of $(TeO_{x1})_{1-z}(x3)_z$ in which $0 < X3 < 1.0$ and $0 < z < 0.5$.

4. The improvement as claimed in claim 1, further comprising a transparent protective layer on said film.

5. An optical information storage device as recited in claim 1, wherein said film further comprises a transition metal oxide.

6. The improvement as claimed in claim 5, wherein said transition metal oxide is a material selected from the group consisting of $CrO_{x4}$, $MnO_{x5}$, and $CoO_{x7}$, wherein $0 < x4 < 1.5$, $0 < x5 < 2$, and $0 < x7 < 1.5$.

7. An optical information storage material comprising a transparent base and a film deposited on said base the state of which can be changed between the low optical density state and the high optical density state by the application of electrical, optical or thermal energy, said film comprising $TeO_{x1}$ in which $0 < x1 < 2.0$.

8. A method of making an optical information storage material having a base and a film deposited on said base which is comprised of $TeO_{x1}$ in which $0 < x1 < 2.0$, comprising evaporating $TeO_2$ under deoxidizing conditions and depositing the vapor on the base.

9. The method as claimed in claim 8 in which the step of evaporating under deoxidizing conditions comprises vacuum evaporating at a vacuum on the order of $5 \times 10^{-5}$ mm Hg.

10. A method of making an optical information storage material having a base and a film deposited on said base which is comprised of $TeO_{x1}$, in which $0 < X1 < 2.0$, and an oxide taken from the group consisting of $VO_{x2}$ and $PbO_{x3}$, in which $0 < X2 < 2.5$ and $0 < X3 < 1.0$, comprising the steps of:
   preparing a solid solution of a tellurium oxide and an oxide taken from the group consisting of a vanadium oxide and a lead oxide; and
   evaporating the solid solution under deoxiding conditions and depositing the vapor of the base.

11. A method as claimed in claim 10 in which the step of preparing the solid solution comprises mixing powdered $TeO_2$ and the other oxide in powdered form, heating the mixture of powders to the melting temperature thereof and holding the melted mixture at the melting temperature for from 3 to 4 hours, and quenching the melted mixture.

* * * * *